United States Patent
Udaka et al.

(10) Patent No.: US 8,744,714 B2
(45) Date of Patent: Jun. 3, 2014

(54) VEHICLE BRAKING CONTROL SYSTEM

(75) Inventors: Satoshi Udaka, Suntou-gun (JP); Noritaka Yamada, Mishima (JP); Hitoshi Terada, Nishio (JP); Akifumi Doura, Obu (JP)

(73) Assignees: Toyota Jidosha Kabushiki Kaisha, Toyota-shi (JP); Advics Co., Ltd., Kariya-shi (JP)

(*) Notice: Subject to any disclaimer, the term of this patent is extended or adjusted under 35 U.S.C. 154(b) by 0 days.

(21) Appl. No.: 13/881,916

(22) PCT Filed: Nov. 11, 2011

(86) PCT No.: PCT/JP2011/076100
§ 371 (c)(1),
(2), (4) Date: Apr. 26, 2013

(87) PCT Pub. No.: WO2012/063943
PCT Pub. Date: May 18, 2012

(65) Prior Publication Data
US 2013/0297171 A1    Nov. 7, 2013

(30) Foreign Application Priority Data
Nov. 12, 2010  (JP) .................... 2010-254195

(51) Int. Cl.
G06F 7/70    (2006.01)
G06F 19/00   (2011.01)
G06G 7/00    (2006.01)

(52) U.S. Cl.
USPC ........................................... 701/70

(58) Field of Classification Search
USPC ........................................... 701/70
See application file for complete search history.

(56) References Cited

U.S. PATENT DOCUMENTS

| 5,187,666 | A | | 2/1993 | Watanabe |
| 5,913,576 | A | | 6/1999 | Naito et al. |
| 6,050,655 | A | * | 4/2000 | Naito et al. .................. 303/173 |
| 6,142,581 | A | | 11/2000 | Yamaguchi et al. |
| 6,549,840 | B1 | * | 4/2003 | Mikami et al. .................. 701/69 |
| 6,878,095 | B2 | * | 4/2005 | Shigyo ............................ 477/86 |
| 8,007,054 | B2 | * | 8/2011 | Kobayashi et al. ........ 303/119.1 |

FOREIGN PATENT DOCUMENTS

| DE | 691 01 161 T2 | 7/1994 |
| JP | 7 223528 | 8/1995 |
| JP | 8 58552 | 3/1996 |

(Continued)

OTHER PUBLICATIONS

International Search Report Issued Feb. 7, 2012 in PCT/JP11/76100 Filed Nov. 11, 2011.

*Primary Examiner* — Mary Cheung
*Assistant Examiner* — Frederick Brushaber
(74) *Attorney, Agent, or Firm* — Oblon, Spivak, McClelland, Maier & Neustadt, L.L.P.

(57) ABSTRACT

A vehicle braking control system includes a wheel cylinder which applies a braking force in accordance with a fluid pressure to a vehicle wheel and a control device which controls the fluid pressure of the wheel cylinder based on the vehicle wheel acceleration. Then, the control device applies the predetermined fluid pressure to the wheel cylinder so as to acquire a return level of the vehicle wheel acceleration and calculates a control target value of the fluid pressure based on a behavior of the vehicle wheel acceleration after starting a sudden braking operation and before starting ABS control.

2 Claims, 5 Drawing Sheets

(56) References Cited

FOREIGN PATENT DOCUMENTS

| JP | 8 301095 | 11/1996 |
| JP | 9 315282 | 12/1997 |
| JP | 10 274175 | 10/1998 |
| JP | 11 152026 | 6/1999 |
| JP | 2000 313326 | 11/2000 |
| JP | 2009 23464 | 2/2009 |

* cited by examiner

VEHICLE BRAKING CONTROL SYSTEM

FIELD

The present invention relates to a vehicle braking control system, and more particularly, to a vehicle braking control system capable of improving robustness of braking control with respect to a change in the road surface friction coefficient μ of a traveling road.

BACKGROUND

In a recent vehicle braking control system, ABS control has been widely adopted. In general, when a vehicle body is decelerated upon suddenly braking a vehicle, a braking force increases before a sufficient load is transferred to a vehicle wheel, so that the vehicle wheel tends to be locked. Then, the ABS control is started, and the control device decreases a fluid pressure P of a wheel cylinder. At this time, the timing of starting the ABS control is defined by a relation between a slip ratio S and a predetermined setting value. Further, the setting value is set based on a road surface friction coefficient μ according to a predetermined characteristic μ-S.

However, when the road surface friction coefficient μ of the traveling road is higher than the setting value (for example, a dry road surface or the like), the compression gradient of the fluid pressure P is not sufficient, and hence the braking force is not sufficient, so that the braking distance increases in length. On the contrary, when the road surface friction coefficient μ of the traveling road is lower than the setting value (for example, a wet road surface or the like), the ABS control is actuated at an early timing, and also the braking force is not sufficient, so that the braking distance increases in length. Accordingly, there is a problem in that the robustness of the braking control may not be ensured with respect to a change in the road surface friction coefficient μ of the traveling road.

Furthermore, as the existing vehicle braking control system having such a problem, a technique disclosed in Patent Literature 1 is known.

CITATION LIST

Patent Literature

Patent Literature 1: Japanese Patent Application Laid-open No. H09-315282

SUMMARY

Technical Problem

Therefore, it is an object of the present invention to provide a vehicle braking control system capable of improving robustness of braking control with respect to a change in the road surface friction coefficient μ of a traveling road.

Solution to Problem

In order to achieve the above mentioned object, a vehicle braking control system according to the present invention includes wheel cylinders configured to apply a braking force in accordance with a fluid pressure to vehicle wheels; and a control device configured to control the fluid pressure of the wheel cylinders based on a vehicle wheel acceleration, wherein when a change amount of the vehicle wheel acceleration is called a return level of the vehicle wheel acceleration, the control device obtains the return level of the vehicle wheel acceleration while maintaining the fluid pressure of the wheel cylinders to be a predetermined fluid pressure, and calculates a control target value of the fluid pressure based on the return level of the vehicle wheel acceleration.

Further, it is preferable that the control device calculates the control target value of the fluid pressure based on a return level of the vehicle wheel acceleration when maintaining the fluid pressure of the wheel cylinders.

Further, it is preferable that when compression control of increasing the fluid pressure of the wheel cylinders to the control target value is called first compression control, the control device performs second compression control of increasing the fluid pressure of the wheel cylinders at a compression gradient gentler than a compression gradient of the first compression control after completing the first compression control and before starting antilock brake control.

Further, in order to achieve the above mentioned object, a vehicle braking control system according to the present invention includes wheel cylinders configured to apply a braking force in accordance with a fluid pressure to vehicle wheels; and a control device configured to control the fluid pressure of the wheel cylinders based on a vehicle wheel acceleration, wherein when a change amount of the vehicle wheel acceleration is called a return level of the vehicle wheel acceleration, the control device obtains the return level of the vehicle wheel acceleration by maintaining the fluid pressure of the wheel cylinders to be a predetermined fluid pressure, and increases a compression gradient of compression control of increasing the fluid pressure of the wheel cylinders to a control target value as the return level of the vehicle wheel acceleration becomes larger.

Advantageous Effects of Invention

The vehicle braking control system according to the present invention can estimate the road surface friction coefficient of the traveling road by observing the behavior of the vehicle wheel acceleration when applying the predetermined fluid pressure to the wheel cylinder. Accordingly, the control target value of the fluid pressure is calculated based on the behavior of the vehicle wheel acceleration, and the fluid pressure of the wheel cylinder is controlled based on the control target value, thereby realizing the braking control reflecting the road surface friction coefficient. At this time, since the fluid pressure of the wheel cylinder is controlled without calculating the road surface friction coefficient, there is an advantage that the robustness of the braking control can be improved.

DESCRIPTION OF EMBODIMENTS

Figure 1:
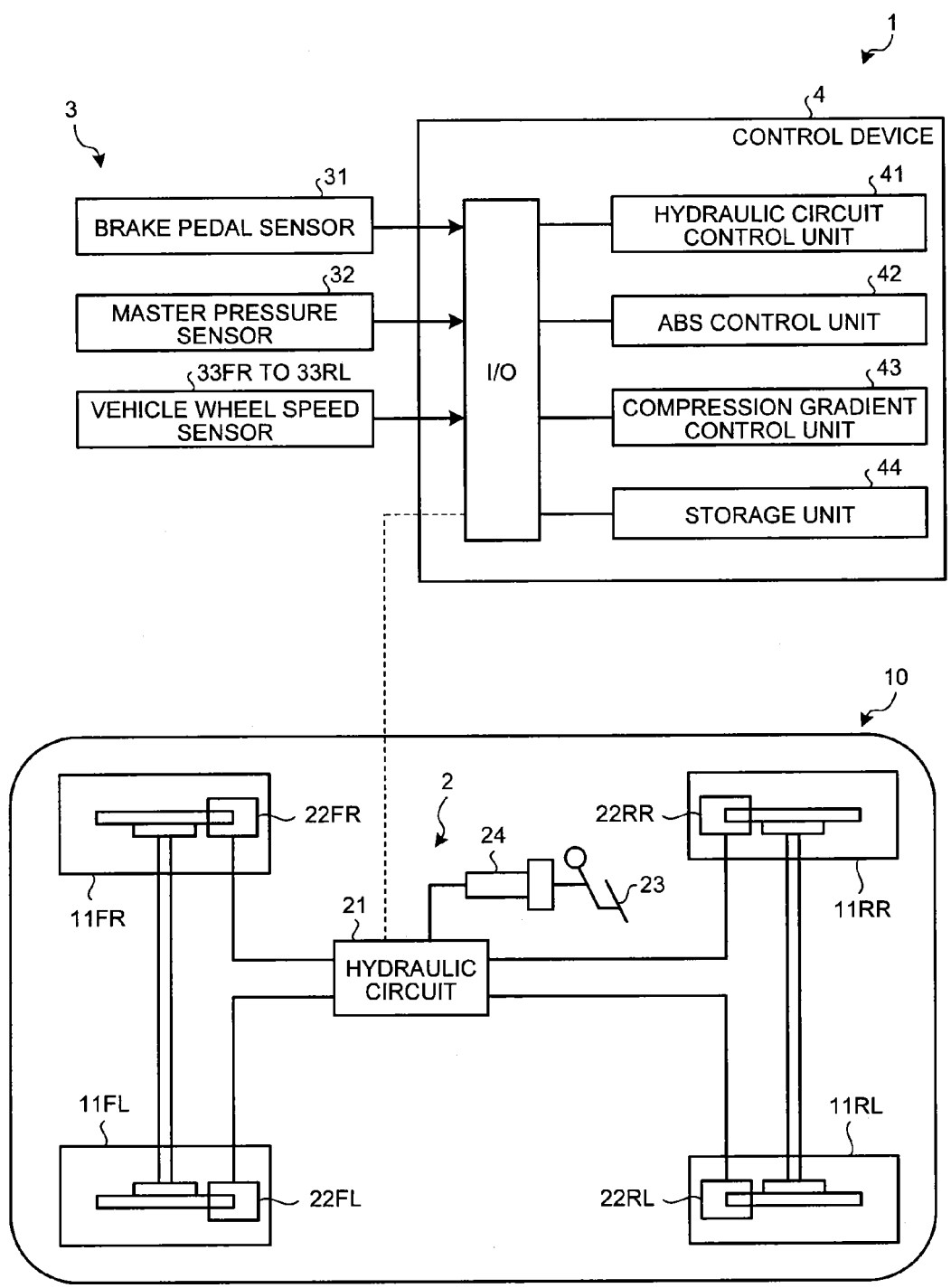
FIG. 1 is a configuration diagram illustrating a vehicle braking control system according to an embodiment of the present invention.

Hereinafter, the present invention will be described in detail by referring to the drawings. Furthermore, the present invention is not limited to the embodiment. Further, the constituents of the embodiment include a replaceable constituent or a constituent which can be apparently replaced while maintaining the identity of the present invention. Further, a plurality of modified examples described in the embodiment can be arbitrarily combined with one another by the person skilled in the art within the apparent scope of the person.

[Vehicle Braking Control System]

FIG. 1 is a configuration diagram illustrating a vehicle braking control system according to the embodiment of the present invention.

A vehicle braking control system 1 is a system which performs control (hereinafter, referred to as vehicle braking control) for braking the vehicle, and particularly, can realize ABS (Antilock Brake System) control. In the embodiment, as an example, a case will be described in which a vehicle 10 is a four-wheel vehicle adopting a FR (Front engine Rear drive) type, a left rear wheel 11RL and a right rear wheel 11RR of the vehicle 10 are driving wheels of the vehicle 10, and a left front wheel 11FL and a right front wheel 11FR thereof are steering wheels of the vehicle 10.

The vehicle braking control system 1 includes a braking device 2, a sensor unit 3, and a control device 4 (see FIG. 1).

The braking device 2 is a device which controls the braking forces for the respective vehicle wheels 11FR to 11RL, and includes a hydraulic circuit 21, wheel cylinders 22FR to 22RL, a brake pedal 23, and a master cylinder 24. The hydraulic circuit 21 includes a reservoir, an oil pump, a hydraulic pressure retaining valve, a hydraulic pressure decreasing valve, and the like (not illustrated).

The sensor unit 3 is a unit which detects information on the vehicle state quantity or the state quantity of the braking device 2. The sensor unit 3 includes a brake pedal sensor 31 which detects a brake pedal stepping amount, a master pressure sensor 32 which detects a pressure of the master cylinder 24, and vehicle wheel speed sensors 33FR to 33RL which respectively detect vehicle wheel speeds VW of the respective vehicle wheels 11FR to 11RL.

The control device 4 is, for example, an ECU (Electrical Control Unit), and controls the driving of the braking device 2 based on the output value of the sensor unit 3. The control device 4 includes a hydraulic circuit control unit 41 which controls the driving of the hydraulic circuit 21 of the braking device 2, an ABS control unit 42 which performs ABS control to be described later, a compression gradient control unit 43 which performs compression gradient control to be described later, and a storage unit 44 which stores predetermined information (for example, a control program, a control map, a threshold value, a setting value, and the like).

In the vehicle braking control system 1, when the driver steps on the brake pedal 23 in a normal driving mode (1), the stepping amount is transmitted to the hydraulic circuit 21 through the master cylinder 24. Then, the hydraulic circuit 21 adjusts the fluid pressures P of the respective wheel cylinders 22FR to 22RL in response to the stepping amount of the brake pedal 23. Accordingly, the respective wheel cylinders 22FR to 22RL are driven, so that the braking force is applied to the respective vehicle wheels 11FR to 11RL.

Further, in a braking control mode (2), the sensor unit 3 detects various vehicle state quantities (for example, a vehicle wheel speed and the like). Then, the control device 4 calculates control target values of the fluid pressures P of the respective wheel cylinders 22FR to 22RL based on the output signal of the sensor unit 3 and controls the fluid pressures P of the respective wheel cylinders 22FR to 22RL by driving the hydraulic circuit 21. Accordingly, the braking forces of the respective vehicle wheels 11FR to 11RL are controlled, so that various braking control such as compression gradient control and ABS control to be described later are realized.

[Compression Gradient Control and ABS Control]

Figure 2:
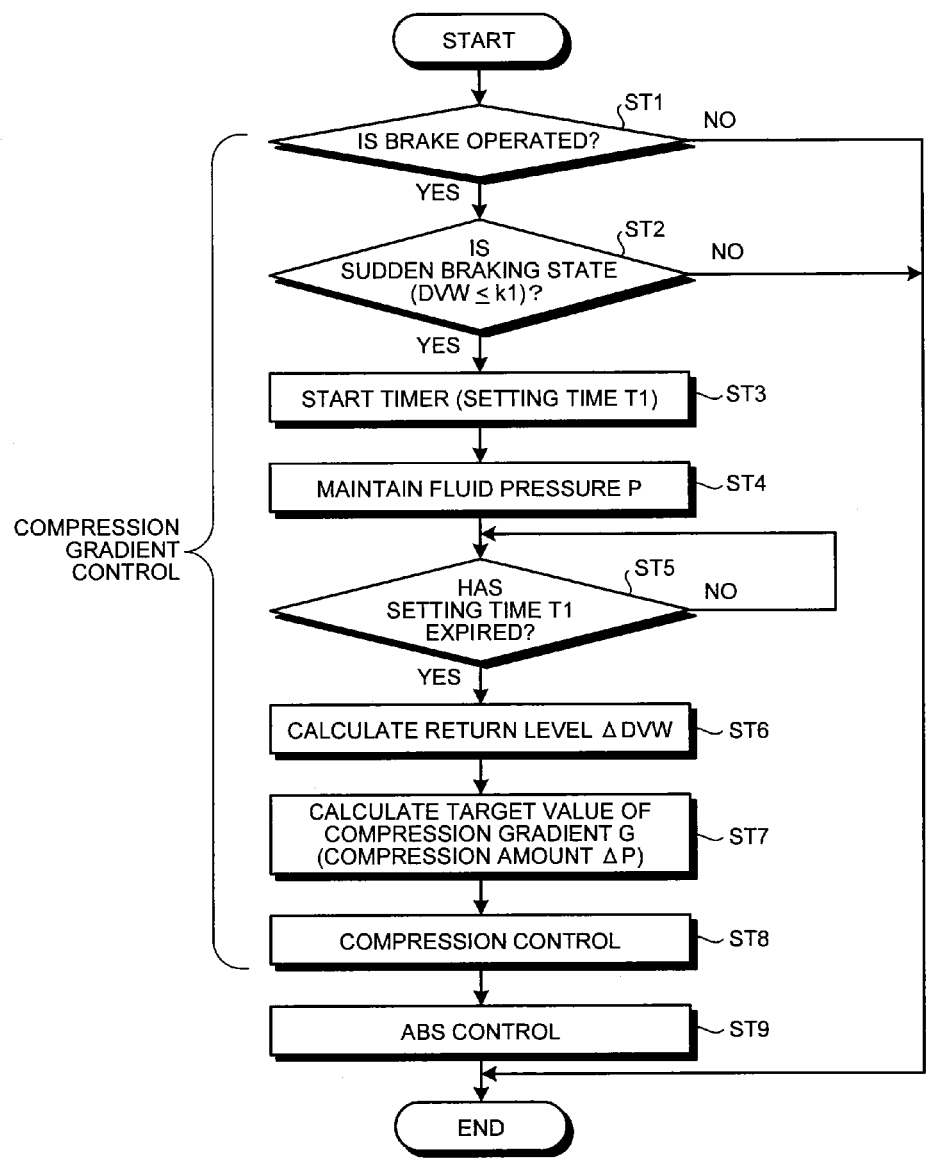
FIG. 2 is a flowchart illustrating an operation of the vehicle braking control system described in FIG. 1.
Figure 3:
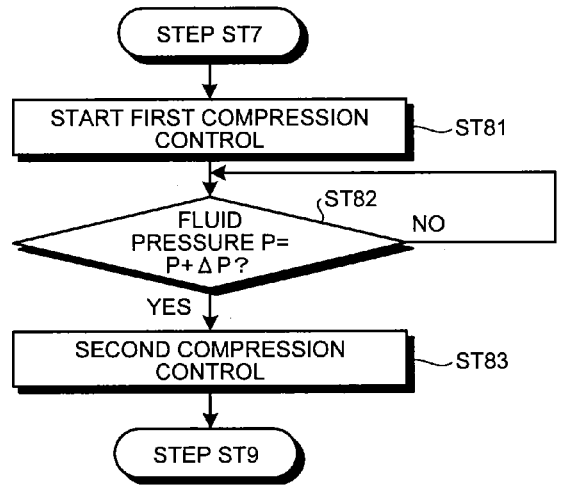
FIG. 3 is a flowchart illustrating an operation of the vehicle braking control system described in FIG. 1.
Figure 4:
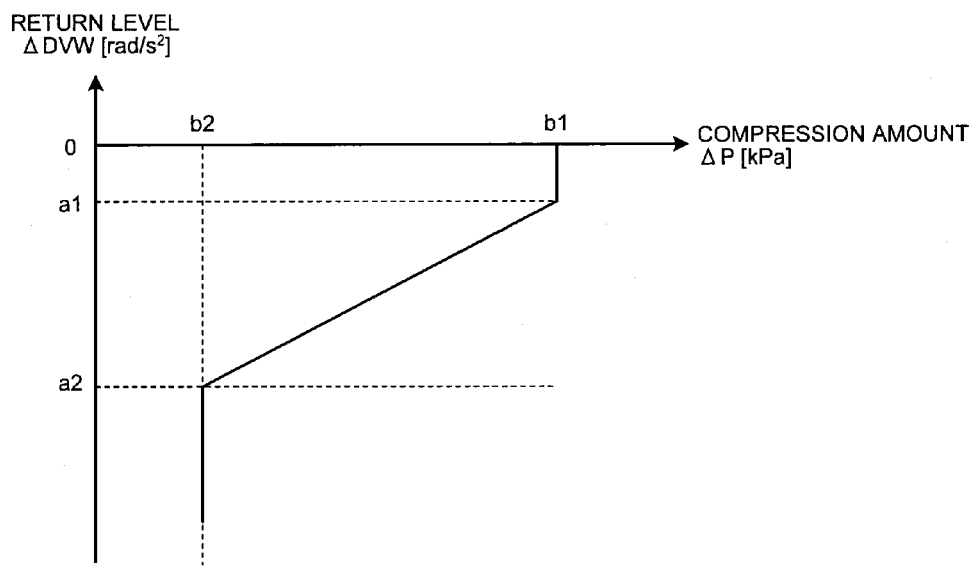
FIG. 4 is an explanatory diagram illustrating an operation of the vehicle braking control system described in FIG. 1.
Figure 5:
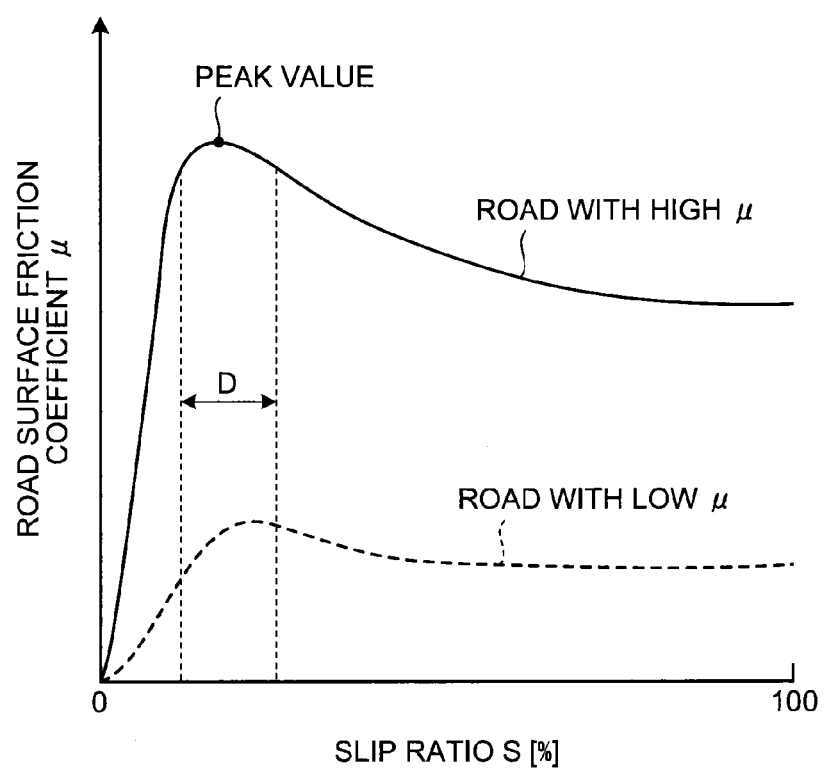
FIG. 5 is an explanatory diagram illustrating an operation of the vehicle braking control system described in FIG. 1.

FIGS. 2 to 5 are flowcharts (FIGS. 2 and 3) and explanatory diagrams (FIGS. 4 and 5) illustrating an operation of the vehicle braking control system described in FIG. 1. In these drawings, FIG. 2 illustrates an entire flow of the braking control. Further, FIG. 3 illustrates a specific flow of the compression control. FIG. 4 illustrates a relation between a return level $\Delta DVW$ of a vehicle wheel acceleration DVW and a compression amount $\Delta P$ of the fluid pressure P of the wheel cylinder. Further, FIG. 5 illustrates a general relation between a slip ratio S and a road surface friction coefficient $\mu$.

Generally, in the vehicle braking control system, when the vehicle body is decelerated upon suddenly braking the vehicle, the braking force increases before a sufficient load is transferred to the vehicle wheels, so that the vehicle wheel is locked. Then, the ABS control is started, so that the control device decompresses the fluid pressure P of the wheel cylinder. At this time, the ABS control start timing is defined by a relation between a slip ratio S and a predetermined setting value. Further, the setting value is set based on the road surface friction coefficient $\mu$ according to a predetermined characteristic $\mu$-S.

However, when the road surface friction coefficient $\mu$ of the traveling road is higher than the setting value (for example, a dry road surface or the like), the compression gradient of the fluid pressure P is not sufficient, and hence the braking force is not sufficient, so that the braking distance increases in length. On the contrary, when the road surface friction coefficient $\mu$ of the traveling road is lower than the setting value (for example, a wet road surface or the like), the ABS control is actuated at an early timing, and also the braking force is not sufficient, so that the braking distance increases in length. Accordingly, there is a problem in that the robustness of the braking control may not be ensured with respect to a change in the road surface friction coefficient $\mu$ of the traveling road.

Therefore, in the vehicle braking control system 1, the braking control is performed as below in order to improve the robustness of the braking control with respect to a change in the road surface friction coefficient $\mu$ of the traveling road. Furthermore, the braking control is independently performed for the respective vehicle wheels 11FR to RL. Here, as an example, a case will be described in which the right front wheel 11FR is controlled.

In step ST1, it is determined whether the brake pedal 23 is stepped on. For example, in the embodiment, the brake pedal sensor 31 detects the stepping amount of the brake pedal 23 in the vehicle running mode. Then, the positive determination is made when the control device 4 acquires the output signal of the brake pedal sensor 31. Furthermore, the control device 4 may perform the determination based on the hydraulic pressure of the master cylinder 24. In step ST1, when the positive determination is made, the routine proceeds to step ST2. When the negative determination is made, the process ends.

In step ST2, it is determined whether the vehicle 10 is suddenly braked. For example, in the embodiment, the respective vehicle wheel speed sensors 33FR to 33RL respectively detect the vehicle wheel speeds VW of the respective vehicle wheels 11FR to RL in the vehicle running mode. Then, the control device 4 calculates the vehicle wheel acceleration DVW from the vehicle wheel speed VW, compares the vehicle wheel acceleration DVW with a predetermined threshold value k1 read out from the storage unit 44, and makes the positive determination when DVW≤k1. In step ST2, when the positive determination is made, the routine proceeds to step ST3. When the negative determination is made, the process ends.

In step ST3, the timer is started. The setting time T1 of the timer becomes a sampling time for measuring the return level ΔDVW of the vehicle wheel acceleration DVW to be described later. Further, the setting time T1 may be arbitrarily set. Furthermore, in the embodiment, the control device 4 includes an internal timer (not illustrated), and manages the counting of the setting time T1. After step ST3, the routine proceeds to step ST4.

In step ST4, the fluid pressure P of the wheel cylinder 22FR corresponding to the vehicle wheel 11FR in which the vehicle wheel acceleration DVW satisfies the inequation of DVW≤k1 (the positive determination of step ST2) is maintained. For example, in the embodiment, the control device 4 drives the hydraulic circuit 21 so as to maintain the driving pressure of the wheel cylinder 22FR at a constant value. After step ST4, the routine proceeds to step ST5.

In step ST5, it is determined whether the setting time T1 of the timer is expired. In step ST5, when the positive determination is made, the routine proceeds to step ST6. When the negative determination is made, step ST5 is repeated.

In step ST6, the return level ΔDVW of the vehicle wheel acceleration DVW is calculated. The return level ΔDVW indicates a change amount of the vehicle wheel acceleration DVW when the fluid pressure P of the wheel cylinder 22FR is maintained. For example, in the embodiment, the fluid pressure P of the wheel cylinder 22FR is maintained from the start of the timer to the expiration of the setting time T1 (step ST3 to step ST5). Further, when starting the timer, the vehicle wheel acceleration DVW is the threshold value k1 (the positive determination of step ST2 and step ST3). Therefore, the control device 4 calculates the vehicle wheel acceleration DVW when the setting time T1 is expired based on the output signal of the vehicle wheel speed sensor 33FR, and calculates the return level ΔDVW of the vehicle wheel acceleration DVW by calculating a difference between the vehicle wheel acceleration DVW=k1 when the timer is started and the vehicle wheel acceleration DVW when the setting time T1 is expired.

Here, when the fluid pressure P of the wheel cylinder 22FR is maintained while suddenly braking the vehicle (step ST4), the vehicle wheel acceleration DVW decreases and increases so as to be returned. At this time, the return level ΔDVW of the vehicle wheel acceleration DVW has a correlation with respect to the road surface friction coefficient μ. Specifically, the return level ΔDVW becomes larger as the road surface friction coefficient μ becomes larger. On the contrary, the return level ΔDVW becomes smaller as the road surface friction coefficient μ becomes smaller. Accordingly, it is possible to perform the braking control reflecting the road surface friction coefficient μ by using the return level ΔDVW of the vehicle wheel acceleration DVW.

Furthermore, in the process of calculating the return level ΔDVW (step ST6), a result which highly precisely reflects the road surface friction coefficient μ may be obtained as the setting time T1 (the sampling time) of the timer becomes longer, and hence this is desirable. On the other hand, when the setting time T1 is too long, the later braking control is late, and hence this is not desirable. Accordingly, it is desirable to appropriately set the length of the setting time T1 in consideration of such a relation. For example, in the embodiment, the setting time T1 is set to T1=24 [ms] to 36 [ms]. After step ST6, the routine proceeds to step ST7.

In step ST7, the control target value of the fluid pressure P of the wheel cylinder 22FR is calculated. The calculation of the control target value is performed based on, for example, the compression amount ΔP or a compression gradient G of the fluid pressure P. Furthermore, the compression amount ΔP is used to increase the slip ratio S of the vehicle wheel 11FR to a predetermined setting value in first compression control to be described later (step ST81). Further, the compression gradient G is a ratio between the compression amount ΔP and the execution time of the first compression control (the time from the start of the first compression control to P=P+ΔP) T2(G=ΔP/T2). Further, the control target value of the fluid pressure P is calculated based on the return level ΔDVW of the vehicle wheel acceleration DVW. Accordingly, the control target value of the fluid pressure P becomes a numerical value which reflects the road surface friction coefficient μ. That is, when the return level ΔDVW is large (the road surface friction coefficient μ is large), it may be estimated that the braking force with respect to the vehicle wheel is not sufficient, and hence the control target value of the fluid pressure P is set to be large. On the other hand, when the return level ΔDVW is small (the road surface friction coefficient μ is small), it may be estimated that the braking force with respect to the vehicle wheel 11FR is sufficient, and hence the control target value of the fluid pressure P is set to be small. Furthermore, in the embodiment, the control device 4 calculates the control target value of the fluid pressure P based on the return level ΔDVW calculated in step ST6 and the control map (see FIG. 4) read out from the storage unit 44. After step ST7, the routine proceeds to step ST8.

In step ST8, the compression control of the fluid pressure P is performed. In the compression control, the maintaining of the fluid pressure P of the wheel cylinder 22FR (step ST4) is canceled, and then the fluid pressure P is controlled so that the pressure increases by using the control target value of the calculated fluid pressure P (step ST7). At this time, the control target value of the fluid pressure P becomes larger as the road surface friction coefficient μ becomes larger. On the contrary, the control target value of the fluid pressure P becomes smaller as the road surface friction coefficient μ becomes smaller. Accordingly, it is possible to realize an appropriate compression of the fluid pressure P reflecting the road surface friction coefficient μ. After step ST8, the routine proceeds to step ST9.

Furthermore, in the embodiment, the compression amount ΔP of the fluid pressure P is used when setting the control target value of the fluid pressure P. Further, the control device 4 drives the hydraulic circuit 21 so as to control the fluid pressure P of the wheel cylinder 22FR. At this time, the compression control of the fluid pressure P is performed as below (see FIGS. 3 and 4).

In step ST81, the first compression control is started. In the first compression control, the control device 4 calculates the control target value of the fluid pressure P(P+ΔP) based on the compression amount ΔP calculated in step ST7 and drives the hydraulic circuit 21 based on the control target value so as to start the process of compressing the fluid pressure P. Accordingly, the fluid pressure P increases by the compression amount ΔP reflecting the road surface friction coefficient μ. After step ST81, the routine proceeds to step ST82.

In step ST82, it is determined whether the fluid pressure P of the wheel cylinder 22FR reaches the control target value. The determination is performed by the control device 4. Furthermore, the time from the start of the first compression control (step ST81) to P=P+ΔP becomes the execution time T2 of the first compression control. Accordingly, the compression gradient G of the fluid pressure P may be calculated by using the execution time T2 and the compression amount ΔP of the fluid pressure P(G=ΔP/T2). In step ST82, when the positive determination is made, the routine proceeds to step ST83. When the negative determination is made, step ST82 is repeated.

In step ST83, second compression control is performed. In the second compression control, the first compression control (step ST81) is completed, and then the fluid pressure P of the wheel cylinder 22FR gradually increases (at a compression gradient G' which is gentler than the compression gradient G of the first compression control). Accordingly, the over-slip is suppressed.

Furthermore, in the second compression control, the compression gradient G' of the fluid pressure P may be set to be constant regardless of the compression amount ΔP of the fluid pressure P in the first compression control, and may be increased or decreased based on the compression amount ΔP. After step ST8, the routine proceeds to step ST9.

As described above, in the compression control of the fluid pressure P (step ST8), the first compression control (step ST81) and the second compression control (step ST83) are sequentially performed, so that the fluid pressure P of the wheel cylinder 22FR gradually increases. That is, in general, when the slip ratio S increases by the sudden braking operation, the road surface friction coefficient μ increases and the peak value of the predetermined range D of about S=20 [%] is obtained (see FIG. 5). Therefore, in the first compression control (step ST81), the fluid pressure P of the wheel cylinder 22FR is increased at an early timing so as to increase the slip ratio S, so that the road surface friction coefficient μ is increased to about the peak value at an early timing. Accordingly, it is possible to apply an appropriate braking force to the vehicle wheel 11FR at an early timing. Further, in the later second compression control (step ST83), the fluid pressure P of the wheel cylinder 22FR is gently increased, so that the road surface friction coefficient μ gradually approaches the peak value. Accordingly, it is possible to apply a sufficient braking force to the vehicle wheel by delaying the start of the ABS control (step ST10). Thus, the braking distance can be shortened.

In step ST9, the ABS control is performed. In the ABS control, when the fluid pressure P of the wheel cylinder 22FR increases by the compression control (step ST9) so that the slip ratio S reaches a predetermined setting value, the fluid pressure P is decreased, maintained, or increased. Accordingly, control is performed so that the slip ratio S is maintained in a predetermined range D (a range where the road surface friction coefficient μ becomes maximal, and see FIG. 5). Accordingly, an appropriate braking force is applied to the vehicle wheel 11FR, so that a spin or a drift of the vehicle 10 is suppressed. After step ST9, the process ends.

Furthermore, the ABS control may adopt the existing control. For example, in the embodiment, the control device 4 estimates a vehicle body speed VV of the vehicle 10 based on the output signals of the vehicle wheel speed sensors 33FR to 33RL of the respective vehicle wheels 11FR to 11RL, and calculates the slip ratio S (=(VV−VW)/VV) of each of the vehicle wheels 11FR to 11RL based on the vehicle body speed VV and the vehicle wheel speed VW of each of the vehicle wheels 11FR to 11RL. Further, the control device 4 determines a control mode (a decompression mode, a maintaining mode, or a compression mode) with respect to the respective wheel cylinders 22FR to 22RL based on the comparison between the slip ratio S and the predetermined setting value. Then, the control device 4 drives the hydraulic circuit 21 of the braking device 2 based on the control mode so as to decompress, maintain, or compress the fluid pressures P of the respective wheel cylinders 22FR to 22RL. Accordingly, the braking pressures of the respective vehicle wheels 11FR to 11RL are controlled and the slip ratio S is maintained in the predetermined range D, so that the road surface friction coefficient μ is appropriately maintained.

Furthermore, in the embodiment, the control device 4 maintains the fluid pressure P of the wheel cylinder 22FR while suddenly braking the vehicle, and calculates the return level ΔDVW of the vehicle wheel acceleration DVW (the positive determination of step ST2 to step ST6) (see FIG. 2). In such a configuration, it is possible to easily calculate the return level ΔDVW corresponding to the road surface friction coefficient μ by maintaining the fluid pressure P. That is, the motion equation of the vehicle wheel may be expressed by I·DVW=μ·W·R−Tb by using a tire inertia I, a ground contact load W, a tire radius R, and a braking torque Tb. Accordingly, when the fluid pressure P is maintained so that the braking torque Tb is constant, the road surface friction coefficient μ may be easily estimated from the vehicle wheel acceleration DVW.

However, the present invention is not limited thereto, and the control device 4 may calculate the return level ΔDVW while changing the fluid pressure P of the wheel cylinder 22FR when starting the sudden braking operation (not illustrated). For example, the return level ΔDVW may be calculated by increasing the fluid pressure P at a predetermined gradient in the predetermined setting time T1 upon starting the sudden braking operation. In such a configuration, since the return level ΔDVW may be calculated while increasing the fluid pressure P, an appropriate braking force may be applied to the vehicle wheel at an early timing.

[Embodiment]

Figure 6:
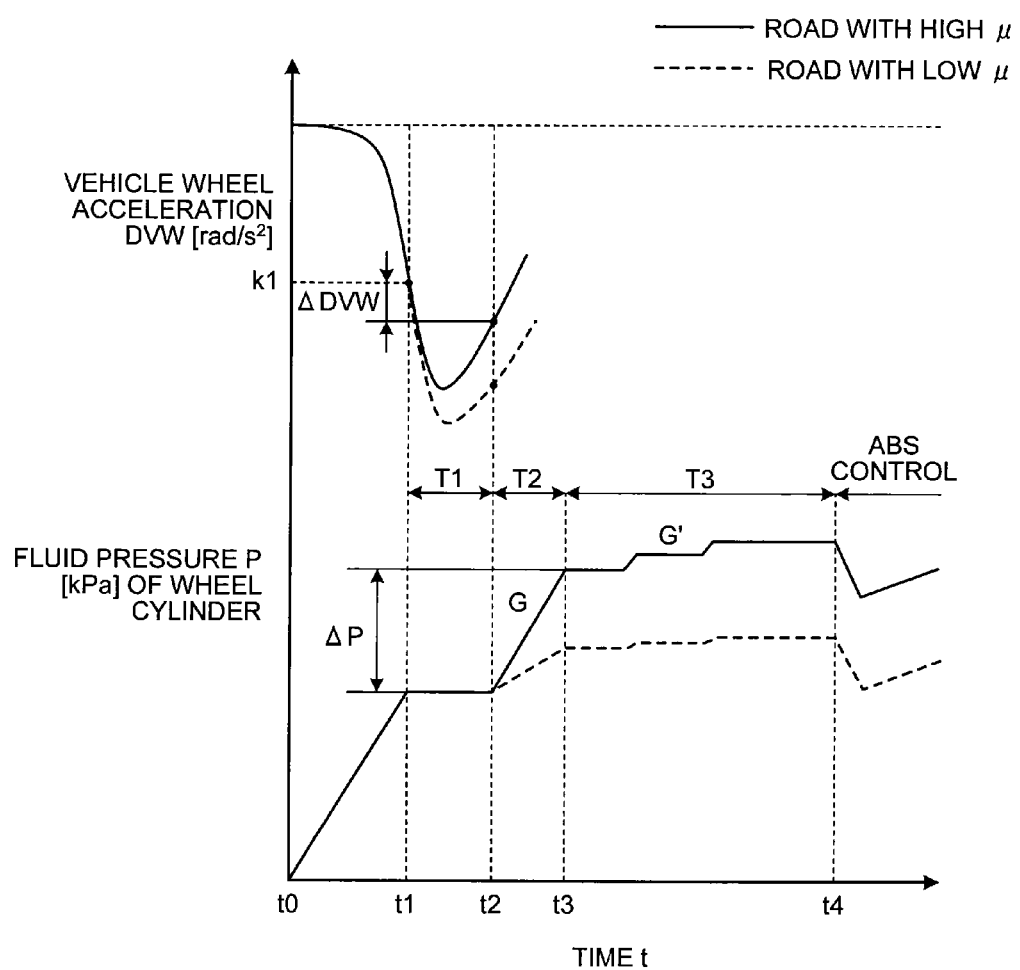
FIG. 6 is a time chart illustrating an embodiment of the vehicle braking control system described in FIG. 1.

FIG. 6 is a time chart illustrating an embodiment of the vehicle braking control system described in FIG. 1. The same drawing illustrates a state of the braking control when running the respective road surfaces having different road surface friction coefficients μ. Hereinafter, the embodiment will be described by referring to FIGS. 2 to 5. Furthermore, here, as an example, a case will be described in which the braking control with respect to the right front wheel 11FR is performed.

At t=t0, when the brake pedal 23 is stepped on in the vehicle running mode, the fluid pressure P of the wheel cylinder 22FR increases from P=0, so that the vehicle wheel acceleration DVW starts to decrease. Then, the control device 4 starts the determination on the sudden braking state based on the vehicle wheel acceleration DVW at the moment of stepping on the brake pedal 23 (the positive determination of step ST1 and step ST2) (see FIG. 2).

At t=t1, the vehicle wheel acceleration DVW largely decreases, so that the vehicle wheel 11FR is suddenly braked. Then, when the vehicle wheel acceleration DVW satisfies the inequation of DVW≤k1, the control device 4 drives the hydraulic circuit 21 so as to maintain the fluid pressure P of the wheel cylinder 22FR (the positive determination of step ST2 and step ST4). Then, since the braking force applied to the vehicle wheel 11FR is maintained, the vehicle wheel acceleration DVW increases so as to be returned. The return level of the vehicle wheel acceleration DVW becomes larger as the road surface friction coefficient μ becomes larger.

At t=t2, the control device 4 calculates the return level ΔDVW of the vehicle wheel acceleration DVW (step ST6). The return level ΔDVW is calculated as a difference between the vehicle wheel acceleration DVW=k1 at the time t1 of starting the maintaining of the fluid pressure P and the vehicle wheel acceleration DVW at t=t2 after the predetermined time T1 elapses. Further, the control device 4 sets the compression amount ΔP based on the return level ΔDVW and the control map (see FIG. 4) read out from the storage unit 44 (step ST7).

At this time, the compression amount ΔP is set to be larger as the return level ΔDVW is larger. Further, the compression amount ΔP is set so that the slip ratio S increases until the road surface friction coefficient μ becomes the peak value (see FIG. 5). Specifically, the compression amount ΔP is set so that the slip ratio S after increasing the fluid pressure P becomes lower than a predetermined setting value.

At t=t2 to t3, the control device 4 starts the first compression control based on the compression amount ΔP (step ST81) (see FIG. 3). Specifically, the control device 4 calculates the control target value of the fluid pressure P(P+ΔP), and drives the hydraulic circuit 21 based on the target value so as to start the process of compressing the fluid pressure P. At this time, the compression gradient G of the fluid pressure P is set so that the first compression control is completed at the predetermined time T2. Accordingly, the compression gradient G of the fluid pressure P becomes larger as the road surface friction coefficient μ becomes larger. Accordingly, the fluid pressure P which reflects the road surface friction coefficient μ is generated in the wheel cylinder 22FR, so that an appropriate braking force is promptly applied to the vehicle wheel 11FR.

At t=t3, the fluid pressure P of the wheel cylinder 22FR reaches the target value, and the first compression control is completed (the positive determination of step ST82). In this state, there is an allowance in the slip ratio S, so that the ABS control (step ST9) is not started.

At t=t3 to t4, the control device 4 starts the second compression control (step ST83) so as to gradually increase the fluid pressure P. At this time, the fluid pressure P is controlled so that the compression gradient G' of the fluid pressure P becomes gentler than the compression gradient G of the first compression control (step ST81). Accordingly, since it takes a long time from the time t3 of completing the first compression control to the time T3 of starting the ABS control (step ST9), a sufficient braking force may be applied to the vehicle wheel 11FR. Accordingly, the braking distance may be shortened.

At t=4, when the fluid pressure P of the wheel cylinder 22FR increases so that the slip ratio S reaches the predetermined setting value, the control device 4 starts the ABS control (step ST9). Accordingly, a spin or a drift of the vehicle 10 is suppressed.

[Effect]

As described above, the vehicle braking control system 1 includes the wheel cylinder 22FR which applies a braking force in accordance with the fluid pressure P to the vehicle wheel 11FR and the control device 4 which controls the fluid pressure P of the wheel cylinder 22FR based on the vehicle wheel acceleration DVW (see FIG. 1). Then, the control device 4 controls the fluid pressure P of the wheel cylinder 22FR so that the fluid pressure becomes a predetermined fluid pressure (for example, the fluid pressure is maintained or increased at a predetermined compression gradient) so as to acquire the behavior (the return level ΔDVW) of the vehicle wheel acceleration DVW, and calculates the control target value of the fluid pressure P based on the behavior of the vehicle wheel acceleration DVW (step ST7) (see FIG. 2).

In such a configuration, the road surface friction coefficient μ of the traveling road may be estimated by observing the behavior of the vehicle wheel acceleration DVW (see t=t2 to t3 of FIG. 6) when applying the predetermined fluid pressure P to the wheel cylinder 22FR. Accordingly, the control target value of the fluid pressure P is calculated based on the behavior of the vehicle wheel acceleration DVW (step ST7), and the fluid pressure P of the wheel cylinder 22FR is controlled based on the control target value (step ST8), thereby realizing the braking control that reflects the road surface friction coefficient μ. At this time, since the fluid pressure P of the wheel cylinder 22FR is controlled without calculating the road surface friction coefficient μ, there is an advantage that the robustness of the braking control can be improved.

Furthermore, in the embodiment, the fluid pressure P of the wheel cylinder 22FR is controlled (step ST7 and step ST8) by calculating the control target value of the fluid pressure P after starting the sudden braking operation (the positive determination of step ST2) and before starting the ABS control (step ST9) (see FIG. 2). However, the present invention is not limited thereto, and the above-described control may be performed during a normal braking operation. That is, the above-described control may be performed at an operation other than the sudden braking operation, and the above-described control may be performed regardless of the execution of the ABS control. For example, the above-described control can arbitrarily performed at any timing based on the road surface friction coefficient μ and the slip ratio S. Accordingly, it is possible to efficiently use a region where the vehicle wheel is not locked.

Further, in the embodiment, in the calculation of the control target value of the fluid pressure P (step ST7), the control device 4 calculates both the compression amount ΔP and the compression gradient G of the fluid pressure P used in the first compression control (step ST81) (see FIGS. 2, 3, and 6). However, the present invention is not limited thereto, and in the calculation of the control target value of the fluid pressure P (step ST7), the control device 4 may calculate any one of the compression amount ΔP and the compression gradient G of the fluid pressure P. For example, the control device 4 may calculate only the compression gradient G and may perform the first compression control without setting the compression amount ΔP (step ST81). In this case, for example, the execution time T2 of the first compression control is set (step ST81), and the fluid pressure P is increased.

Further, in the vehicle braking control system 1, the control device 4 calculates the control target value of the fluid pressure P based on the return level ΔDVW of the vehicle wheel acceleration DVW when maintaining the fluid pressure P of the wheel cylinder 22FR (step ST7) (see FIG. 2). In such a configuration, it is possible to easily and highly precisely acquire the return level ΔDVW of the vehicle wheel acceleration DVW by maintaining the fluid pressure P (see FIG. 6). Then, it is possible to simply calculate the control target value of the fluid pressure P by using the return level ΔDVW. Accordingly, there is an advantage that the configuration of the control device 4 can be simplified.

Further, in the vehicle braking control system 1, the control device 4 performs the second compression control of increasing the fluid pressure P of the wheel cylinder 22FR at the compression gradient G' gentler than the compression gradient G in the first compression control (step ST83) after completing the first compression control (step ST81) and before starting the ABS control (step ST9) (see FIG. 3). In such a configuration, an appropriate braking force can be applied to the vehicle wheel 11FR at an early timing by the first compression control. Further, it is possible to gradually approach the road surface friction coefficient μ to the peak value by gently increasing the fluid pressure P of the wheel cylinder 22FR using the later second compression control. Accordingly, since a sufficient braking force may be applied to the vehicle wheel by delaying the start of the ABS control (step ST9), there is an advantage that the braking distance can be shortened.

Further, in the vehicle braking control system 1, the control device 4 increases the compression gradient G in the compression control of increasing the fluid pressure P of the wheel cylinder 22FR to the control target value as the behavior of the vehicle wheel acceleration DVW becomes smaller (step ST8 of FIG. 2) while the fluid pressure P of the wheel cylinder 22FR is controlled so that the fluid pressure becomes a predetermined fluid pressure (t1 to t2 of FIG. 6) (see FIG. 4).

Further, in the vehicle braking control system 1, the control device 4 increases the compression gradient G in the compression control of increasing the fluid pressure P to the control target value as the return level ΔDVW of the vehicle wheel acceleration DVW becomes larger when maintaining the fluid pressure P of the wheel cylinder 22FR (step ST8 of FIG. 2) (see FIG. 4).

Industrial Applicability

As described above, the vehicle braking control system according to the present invention is useful in that the robustness of the braking control with respect to a change in the road surface friction coefficient μ of the traveling road may be improved.

REFERENCE SIGNS LIST

1 vehicle braking control system
2 braking device
21 hydraulic circuit
22FR to 22RL wheel cylinder
23 brake pedal
24 master cylinder
3 sensor unit
31 brake pedal sensor
32 master pressure sensor
33FR to 33RL vehicle wheel speed sensor
4 control device
41 hydraulic circuit control unit
42 ABS control unit
43 compression gradient control unit
44 storage unit
10 vehicle

The invention claimed is:

1. A vehicle braking control system comprising:
    wheel cylinders configured to apply a braking force in accordance with a fluid pressure to vehicle wheels; and
    a control device configured to control the fluid pressure of the wheel cylinders based on a vehicle wheel acceleration, wherein
    when a change amount of the vehicle wheel acceleration is called a return level of the vehicle wheel acceleration while maintaining the fluid pressure of the wheel cylinders or increasing the fluid pressure at a predetermined gradient,
    the control device obtains the return level of the vehicle wheel acceleration while maintaining or increasing the fluid pressure of the wheel cylinders after starting a sudden braking operation and before starting an antilock brake control, and calculates a control target value of the fluid pressure based on the return level of the vehicle wheel acceleration.

2. The vehicle braking control system according to claim 1, wherein
    when compression control of increasing the fluid pressure of the wheel cylinders to the control target value is called first compression control, the control device performs second compression control of increasing the fluid pressure of the wheel cylinders at a compression gradient gentler than a compression gradient of the first compression control after completing the first compression control and before starting antilock brake control.

* * * * *